(12) United States Patent
Lai

(10) Patent No.: US 8,077,399 B1
(45) Date of Patent: Dec. 13, 2011

(54) FOUR-PIECE IMAGING LENS MODULE

(75) Inventor: Shu-Tzu Lai, Tai-Chung County (TW)

(73) Assignee: Newmax Technology Co., Ltd., Tai-Chung County (TW)

( * ) Notice: Subject to any disclaimer, the term of this patent is extended or adjusted under 35 U.S.C. 154(b) by 0 days.

(21) Appl. No.: 12/973,148

(22) Filed: Dec. 20, 2010

(51) Int. Cl.
*G02B 3/02* (2006.01)
*G02B 9/34* (2006.01)

(52) U.S. Cl. ........ 359/715; 359/644; 359/660; 359/739; 359/774

(58) Field of Classification Search ................... 359/644, 359/660, 715, 739, 771–774
See application file for complete search history.

(56) References Cited

U.S. PATENT DOCUMENTS

2009/0185288 A1* 7/2009 Taniyama ..................... 359/715
* cited by examiner

*Primary Examiner* — Evelyn A. Lester
(74) *Attorney, Agent, or Firm* — Muncy, Geissler, Olds & Lowe, PLLC

(57) ABSTRACT

A four-piece imaging lens module includes a fixed aperture diaphragm, a first lens, a second lens, a third lens and a fourth lens arranged from an object side to an image side in a sequence of: the diaphragm; the first lens of a positive refractive power, having a convex surface on the object side and at least one aspheric surface; the second lens of a negative refractive power with a meniscus shape, having a convex surface on the image side and at least one aspheric surface; the third lens of a positive refractive power with a meniscus shape, having a concave surface on the object side and at least one aspheric surface; the fourth lens of a positive refractive power, having a concave surface on the image side and at least one aspheric surface. The invention is to provide a four-piece imaging lens module with higher definition and higher yield rate.

10 Claims, 9 Drawing Sheets

Focal length : f = 3.55 mm
Brightness (F NO.) : F 2.4
Viewing angle : 2ω = 58°

| Surface | Radius | Thickness | Nd(refractivity) | Vd(abbe number) |
|---|---|---|---|---|
| OBJECT | Infinity | Infinity | | |
| STO | Infinity | 0.06285372 | | |
| 2 | 5.394782 | 1.439707 | 1.535000 | 56 |
| 3 | -1.543428 | 0.5210778 | | |
| 4 | -0.9218548 | 0.3889385 | 1.607000 | 27 |
| 5 | -4.091323 | 0.302405 | | |
| 6 | -1.313899 | 0.5716295 | 1.514000 | 57 |
| 7 | -1.065454 | 0.05864348 | | |
| 8 | 1.650682 | 0.8206102 | 1.514000 | 57 |
| 9 | 2.412534 | 0.3041973 | | |
| 10 | Infinity | 0.3 | 1.516798 | 64.198266 |
| 11 | Infinity | 0.31403 | | |
| 12 | Infinity | 0.55 | 1.516800 | 64.167336 |
| 13 | Infinity | 0.72 | | |
| IMAGE | Infinity | | | |

SURFACE DATA DETAIL:

| Surface 2 | Surface 3 | Surface 4 | Surface 5 |
|---|---|---|---|
| K : -14.11851 | K : 0.3509205 | K : -0.6919445 | K : -4.040652 |
| A : -0.089953752 | A : -0.028698108 | A : -0.087643563 | A : -0.083638759 |
| B : 0.41232653 | B : 0.1034152 | B : 0.32496873 | B : 0.055997094 |
| C : -1.1615296 | C : -0.10914259 | C : -0.21856037 | C : -0.010333728 |
| D : 1.0209799 | D : 0.050367104 | D : 0.065219119 | D : -0.002103417 |

| Surface 6 | Surface 7 | Surface 8 | Surface 9 |
|---|---|---|---|
| K : -5.593162 | K : -0.745634 | K : -5.576162 | K : -19.01808 |
| A : 0.016901893 | A : 0.097250758 | A : 0.037049205 | A : -0.002568419 |
| B : -0.060151451 | B : -0.01762246 | B : -0.015587914 | B : 0.0015596591 |
| C : 0.036849753 | C : 0.008026592 | C : 0.003590962 | C : -0.000811972 |
| D : -0.007271905 | D : 0.000479336 | D : -0.0005246 | D : -4.55171e-05 |

$\dfrac{|f_1|}{|f_2|} = 1.181$    $\dfrac{|f|}{|TL|} = 0.559$    $\dfrac{|f_3|}{|f_4|} = 0.826$ $\dfrac{|f_2|}{|f_3|} = 0.333$    $\dfrac{|f_{34}|}{|f|} = 0.839$

Fig. 1B

Focal length : f = 4.04 mm
Brightness (F NO.) : F 2.4
Viewing angle : 2ω = 52°

| Surface | Radius | Thickness | Nd(refractivity) | Vd(abbe number) |
|---------|--------|-----------|------------------|-----------------|
| OBJECT | Infinity | Infinity | | |
| STO | Infinity | 0.1466808 | | |
| 2 | 2.328828 | 1.588232 | 1.531000 | 56 |
| 3 | -3.84148 | 0.4667763 | | |
| 4 | -0.826059 | 0.6325192 | 1.607000 | 27 |
| 5 | -3.153848 | 0.07241225 | | |
| 6 | -8.934254 | 0.7160985 | 1.514000 | 57 |
| 7 | -1.545631 | 0.05864348 | | |
| 8 | 1.827404 | 0.7243113 | 1.514000 | 57 |
| 9 | 1.835211 | 0.3041973 | | |
| 10 | Infinity | 0.3 | 1.516798 | 64.198266 |
| 11 | Infinity | 0.3159772 | | |
| 12 | Infinity | 0.55 | 1.516798 | 64.198266 |
| 13 | Infinity | 0.72 | | |
| IMAGE | Infinity | | | |

SURFACE DATA DETAIL:

| Surface 2 | Surface 3 | Surface 4 | Surface 5 |
|-----------|-----------|-----------|-----------|
| K : 0.1574281 | K : 6.064074 | K : -0.9083818 | K : 0.407263 |
| A : 0.10694396 | A : 0.042321391 | A : 0.15961067 | A : 0.034017307 |
| B : -0.14671928 | B : -0.055516288 | B : -0.04271746 | B : 0.001042802 |
| C : 0.088729096 | C : 0.032265062 | C : 0.041319937 | C : 0.000500768 |
| D : -0.018189325 | D : 0.005365323 | D : -0.01063096 | D : 0.000202628 |
| Surface 6 | Surface 7 | Surface 8 | Surface 9 |
| K : -393.6674 | K : -0.7022172 | K : -4.649054 | K : -8.927055 |
| A : 0.000293567 | A : 0.099156421 | A : 0.016873233 | A : -0.0042146655 |
| B : -0.01928218 | B : -0.046921999 | B : -0.01827957 | B : -0.013232575 |
| C : 0.004241271 | C : 0.017688652 | C : 0.005720878 | C : 0.0037710375 |
| D : 0.000808052 | D : -0.001885336 | D : -0.00077493 | D : -0.0004673128 |

$\dfrac{|f_1|}{|f_2|} = 1.465$ $\quad$ $\dfrac{|f|}{|TL|} = 0.613$ $\quad$ $\dfrac{|f_3|}{|f_4|} = 0.137$ $\dfrac{|f_2|}{|f_3|} = 0.581$ $\quad$ $\dfrac{|f_{34}|}{|f|} = 0.681$

Fig. 2B

Non-point Aberration and Distorted Aberration

Spherical Surface Aberration

Focal length : f = 3.42 mm
Brightness (F NO.) : F 2.4
Viewing angle : 2ω= 56°

| Surface | Radius | Thickness | Nd(refractivity) | Vd(abbe number) |
|---|---|---|---|---|
| OBJECT | Infinity | Infinity | | |
| STO | Infinity | 0.1431384 | | |
| 2 | 3.957881 | 1.388931 | 1.535000 | 56 |
| 3 | -1.455599 | 0.3576748 | | |
| 4 | -0.8907741 | 0.4255983 | 1.607000 | 27 |
| 5 | -4.599126 | 0.3389658 | | |
| 6 | -1.429013 | 0.5872993 | 1.514000 | 57 |
| 7 | -0.9950593 | 0.05864348 | | |
| 8 | 1.762399 | 0.7140588 | 1.514000 | 57 |
| 9 | 1.99816 | 0.3041973 | | |
| 10 | Infinity | 0.3 | 1.516798 | 64.198266 |
| 11 | Infinity | 0.310529 | | |
| 12 | Infinity | 0.55 | 1.516798 | 64.198266 |
| 13 | Infinity | 0.72 | | |
| IMAGE | Infinity | | | |

SURFACE DATA DETAIL:

| Surface 2 | Surface 3 | Surface 4 | Surface 5 |
|---|---|---|---|
| K : -4.537031 | K : -0.3818288 | K : -0.5212222 | K : -7.898845 |
| A : 0.22122448 | A : 0.042030603 | A : 0.06266844 | A : -0.029573257 |
| B : -0.47661759 | B : -0.025002671 | B : 0.21395334 | B : 0.014213534 |
| C : 0.35196416 | C : -0.025713514 | C : -0.14777134 | C : 0.001851975 |
| D : -0.099344704 | D : 0.019790182 | D : 0.06277287 | D : -0.003300503 |
| Surface 6 | Surface 7 | Surface 8 | Surface 9 |
| K : -1.941889 | K : -0.8335309 | K : -3.946123 | K : -11.3934 |
| A : 0.050433288 | A : 0.078490634 | A : 0.02730193 | A : -0.004936414 |
| B : -0.078588835 | B : -0.012926671 | B : -0.012819389 | B : 0.001955523 |
| C : 0.040168294 | C : 0.006150618 | C : 0.002668535 | C : -0.001822352 |
| D : -0.004615273 | D : 0.001970994 | D : -0.00051351 | D : 8.9704e-005 |

$\dfrac{|f_1|}{|f_2|} = 1.153$  $\dfrac{|f|}{|TL|} = 0.552$  $\dfrac{|f_3|}{|f_4|} = 0.305$ $\dfrac{|f_2|}{|f_3|} = 0.434$  $\dfrac{|f_{34}|}{|f|} = 0.867$

Fig. 3B

FOUR-PIECE IMAGING LENS MODULE

BACKGROUND OF THE INVENTION

1. Field of the Invention

The present invention relates to the field of optical lenses, and more particularly to a four-piece imaging lens module capable of providing smaller chief ray angle of light sensor, high definition and higher yield rate.

2. Description of the Prior Art

At present, digital carriers having a lens module, which has a function of photo-taking or filming, will increase its additional value and will attract young group. Some portable digital carriers such as digital cameras, mobile phones, NB, video players or Webcams are also provided with such lens modules. However, these portable digital carriers are small in size, thus imposing some limitations on the lens module. That is, the length of the lens module is inevitably limited.

Besides, the competitive market also results in the reduction of profit. In order to obtain product differentiation, the digital carriers are further provided with high level lens modules for marketing purposes. That is, the cost of producing the lens modules should be cut down, and the quality of the lens modules should be improved.

For the limitation and the purposes above, lens which has one or two aspheric surface(s) is used as an alternative. However, it is used only in two-piece and three-piece lens modules. To achieve the requirement of high-definition, four-piece lens module is still irreplaceable.

In conventional four-piece lens module, the second lens has a convex surface on the object side. The third lens has a convex surface on the image side. The fourth lens has a convex surface on the object side around the light axis of the fourth lens. However, such four-piece lens module is difficult to be produced, so that the yield rate can hardly be improved. In addition, the lens module is also difficult to provide a smaller chief ray angle for light receiver or light sensor.

As such, the present invention is arisen to obviate or at least mitigate the above mentioned disadvantages.

SUMMARY OF THE INVENTION

The main object of the present invention is to provide a four-piece imaging lens module with smaller system discrepancy, higher yield rate, smaller chief ray angle and higher definition.

To achieve the above and other objects, the four-piece imaging lens module includes a fixed aperture diaphragm, a first lens, a second lens, a third lens and a fourth lens, arranged from an object side to an image side in a sequence of: the diaphragm, the first lens, the second lens, the third lens and the fourth lens.

The first lens has a positive refractive power, a convex surface on the object side, and having at least one aspheric surface. The second lens has a meniscus shape, a negative refractive power, a convex surface on the image side, and having at least one aspheric surface. The third lens has a meniscus shape, a positive refractive power, a concave surface on the object side, and having at least one aspheric surface. The fourth lens has a positive refractive power, a concave surface on the image side, and having at least one aspheric surface.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric surface coefficients of an imaging lens module in accordance with a first preferred embodiment of the present invention;

FIG. 2B is a schematic view showing the data of optical features and aspheric surface coefficients of an imaging lens module in accordance with a second preferred embodiment of the present invention;

FIG. 3B is a schematic view showing the data of optical features and aspheric surface coefficients of an imaging lens module in accordance with a third preferred embodiment of the present invention.

DETAILED DESCRIPTION OF THE PREFERRED EMBODIMENTS

Figure 1:
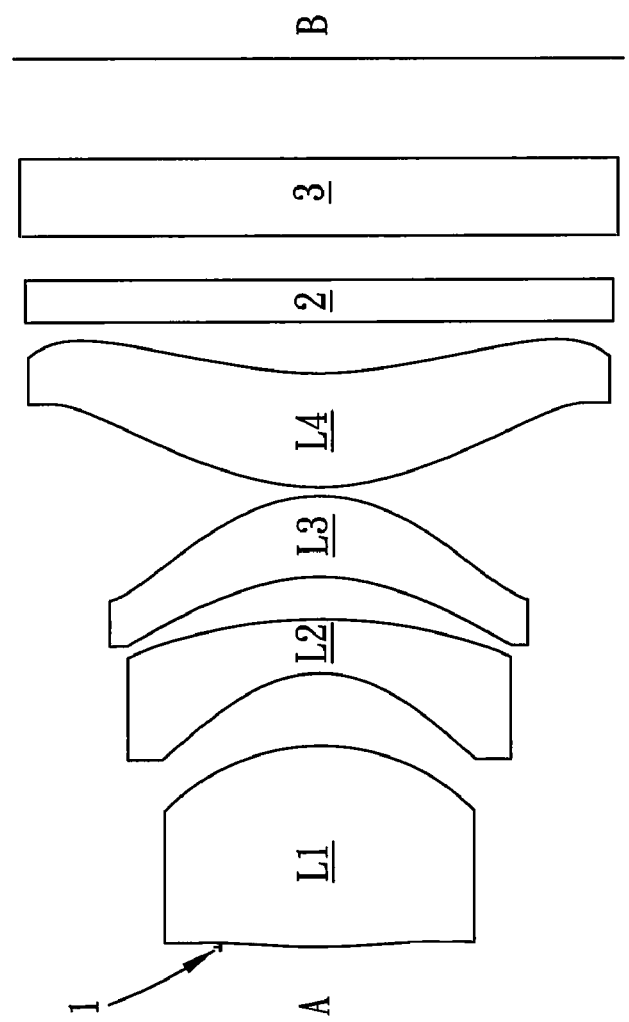
FIG. 1 is a schematic view showing an imaging lens module in accordance with a first preferred embodiment of the present invention.
Figure 2:
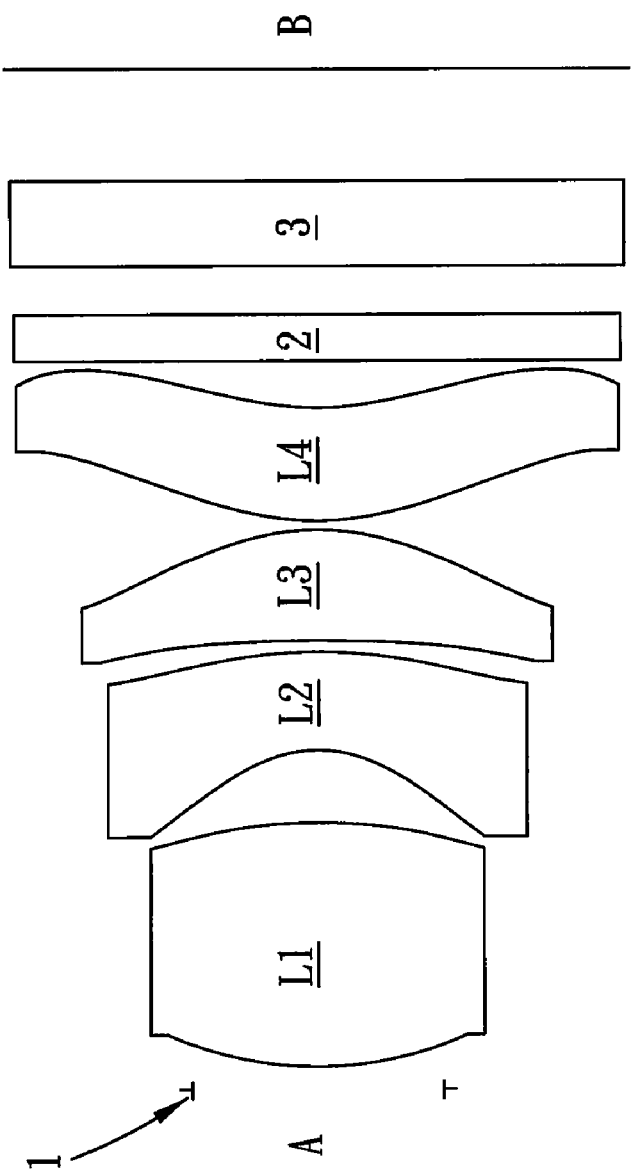
FIG. 2 is a schematic view showing an imaging lens module in accordance with a second preferred embodiment of the present invention.
Figure 3:
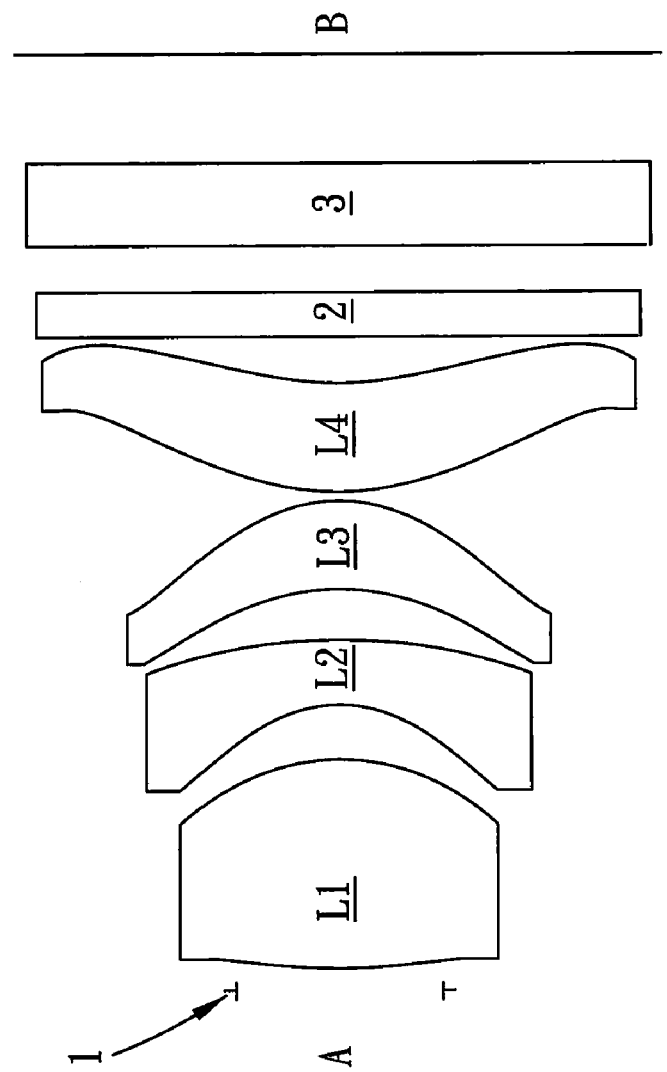
FIG. 3 is a schematic view showing an imaging lens module in accordance with a third preferred embodiment of the present invention.

FIGS. 1, 2 and 3 show schematic views of imaging lens module lens modules in accordance with the first, second and third preferred embodiments of the present invention respectively. The four-piece imaging lens modules of the present invention are provided for small digital carriers. Each imaging lens module includes a fixed aperture diaphragm 1 and an optical module, which includes a first lens L1, a second lens L2, a third lens L3 and a fourth lens L4. The diaphragm 1 and the optical module are arranged from an object side A to an image side B in a sequence of: the diaphragm 1, the first lens L1, the second lens L2, the third lens L3 and the fourth lens L4.

The first lens L1 has a positive refractive power, a convex surface on the object side A, and having at least one aspheric surface. The second lens L2 has a meniscus shape, a negative refractive power, a convex surface on the image side B, and having at least one aspheric surface. The third lens L3 has a meniscus shape, a positive refractive power, a concave surface on the object side A, and having at least one aspheric surface. The fourth lens L4 has a positive refractive power, a concave surface on the image side B, and having at least one aspheric surface.

In the optical module composed of four lenses in accordance to the system of the invention, a first plane glass 2 is disposed behind the fourth lens L4, having a filtering infrared effect. In addition, a second plane glass 3 is installed before the image side B for providing an effect of protecting the light sensor and used for image sensors of different packages and providing a better imaging quality. Further, the image side B refers to a light sensor for capturing images, and the light sensor is a CCD or a CMOS.

Preferably, each lens in the imaging lens module is made of a plastic material so as to cut the cost of producing and managing down. Moreover, the plastic material allows the lens to be shown in the structure with an aspheric surface, and the lens is used as an aspheric lens for providing a higher resolving power and reducing the number of lenses required for the imaging process, so as to achieve a good imaging quality of lens module.

Figure 1A:
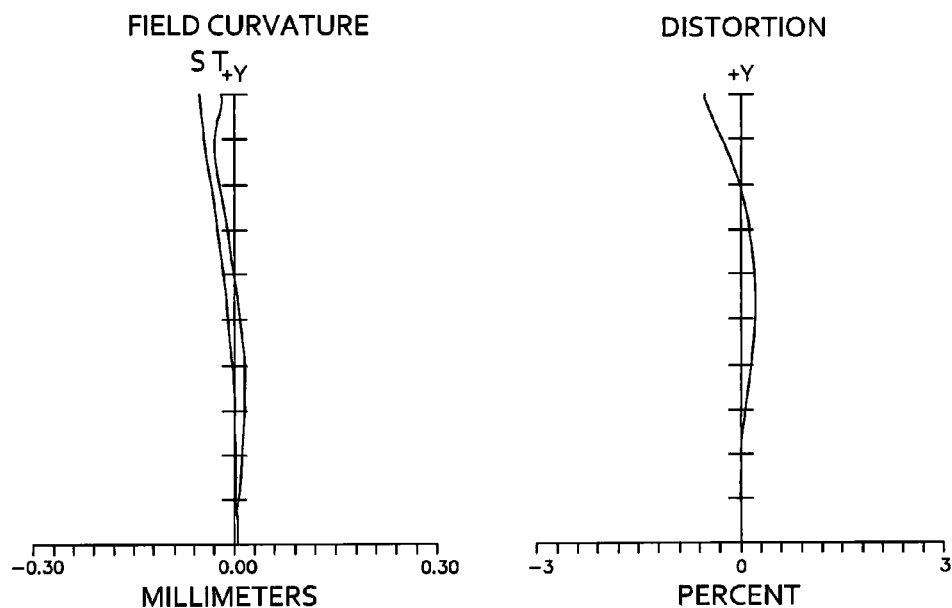
FIG. 1A is a schematic view showing the aberration of an imaging lens module in accordance with a first preferred embodiment of the present invention.
Figure 1A:
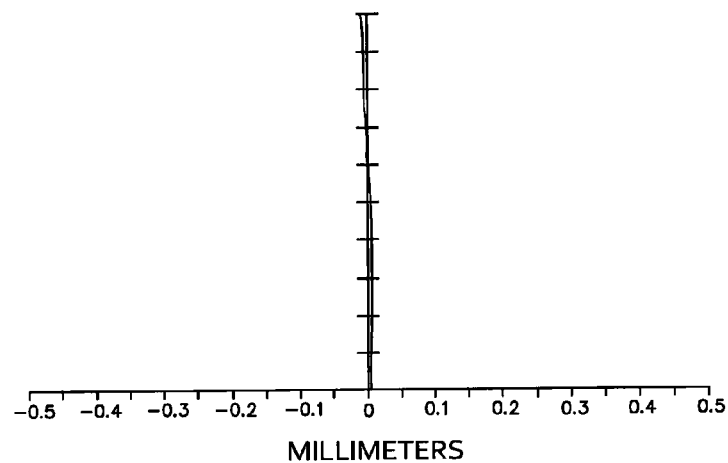
Figure 2A:
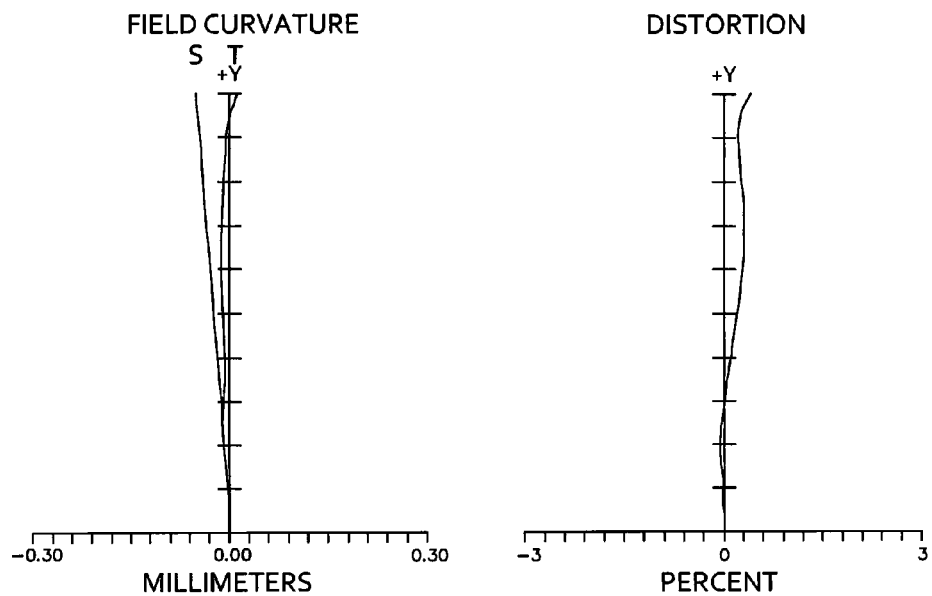
FIG. 2A is a schematic view showing the aberration of an imaging lens module in accordance with a second preferred embodiment of the present invention.
Figure 2A:
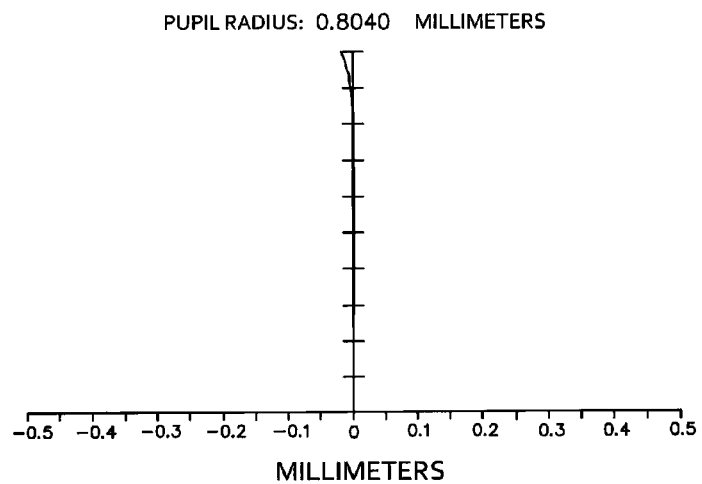
Figure 3A:
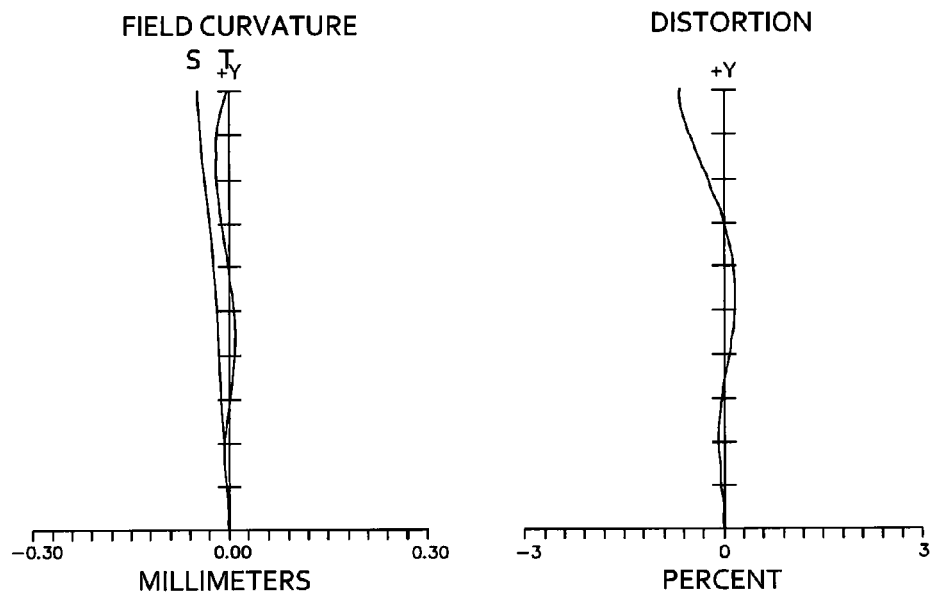
FIG. 3A is a schematic view showing the aberration of an imaging lens module in accordance with a third preferred embodiment of the present invention.
Figure 3A:
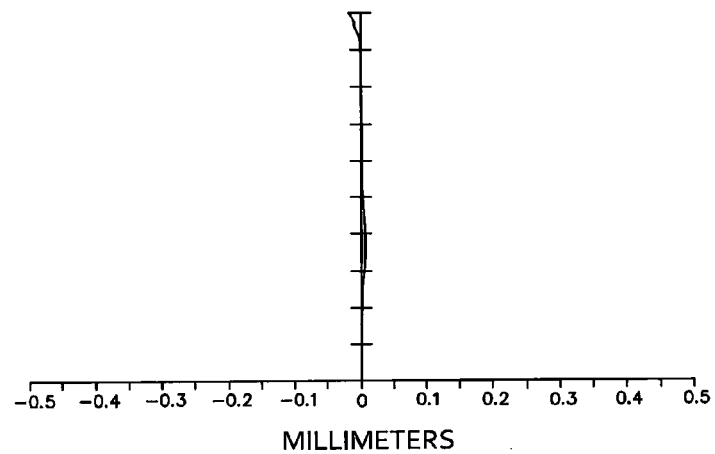

In addition, the schematic views of the aberration of the invention are non-point aberration, distorted aberration and spherical surface aberration as shown in FIG. 1A, FIG. 2A and FIG. 3A. Regardless of which aberration, the aberration relates to a data of a line d, and the non-point aberration relates to the data of an S image plane (SAGITTAL) which is related to the data of a T image plane (TANGENTIAL).

From the figures of the aberrations, the correction of the aberration of the invention is obtained completely from a simulated design, and thus there will be no problems in practical applications.

Refer to FIG. 1B, FIG. 2B and FIG. 3B for the data of aspheric surfaces in accordance with the first, second and third preferred embodiments of the invention, the data displayed at the top are numerals representing each lens or element of the optical module of the invention.

The value of F. No. shows the parameter of brightness. The smaller the value of F is, the higher the brightness is.

Viewing angle: 2ω.

Focal Length f: f is the overall focal length (mm) of the optical module, and 2, 3, 4, 5, 6, 7, 8, 9, 10, 11, 12, 13 listed below are numbers of lenses counting in a sequence starting from the object side; the surface numbers 2, 3 represent two surfaces of the first lens L1, the surface numbers 4, 5 represent two surfaces of the second lens L2, the surface numbers 6, 7 represent two surfaces of the third lens L3, the surface numbers 8, 9 represent two surfaces of the fourth lens L4, and 10, 11, 12, 13 represent two surfaces of the first plane glass 2 and the second plane glass 3 respectively.

In the invention, the focal length value f1 of the first lens and the focal length value f2 of the second lens must satisfy the following relationship to achieve the best quality:

$$0.5 < |f1|/|f2| < 2.0$$

In the invention, the focal length value f2 of the second lens and the focal length value f3 of the third lens must satisfy the following relationship:

$$0.1 < |f2|/|f3| < 1.0$$

In the invention, the focal length value f3 of the third lens and the focal length value f4 of the fourth lens must satisfy the following relationship:

$$0 < |f3|/|f4| < 1.5$$

In the invention, the overall focal length value f34 of the third lens and the fourth lens and the focal length value f of the whole lens module must satisfy the following relationship:

$$0.3 < |f34|/|f| < 1.5$$

Also, the focal length value f of the whole lens module and the distance TL between the first surface of the first lens and an imaging surface must satisfy the following relationship:

$$0.2 < |f/TL| < 0.8$$

If the above relationship is not satisfied, the performance, the resolving power and the yield rate of the lens module will be decreased.

Since every lens of the lens module has at least one aspheric surface, the shape of the aspheric surface must satisfy the condition of the following formula:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the four-piece imaging lens module of the present invention, the coordination of the first, second, third and fourth lenses enables the lens module to obtain better performance, such as high-definition, and obtain higher yield rate. Also, the miniaturization of the lens module can be achieved so as to meet small digital carriers' specifications.

What is claimed is:

1. A four-piece imaging lens module, comprising a fixed aperture diaphragm, a first lens, a second lens, a third lens and a fourth lens arranged from an object side to an image side in a sequence of:

the fixed aperture diaphragm;

the first lens, having a positive refractive power, a convex surface on the object side, and having at least one aspheric surface;

the second lens, having a meniscus shape, a negative refractive power, a convex surface on the image side, and having at least one aspheric surface;

the third lens, having a meniscus shape, a positive refractive power, a concave surface on the object side, and having at least one aspheric surface;

the fourth lens, having a positive refractive power, a concave surface on the image side, and having at least one aspheric surface.

2. The imaging lens module of claim 1, wherein $0.5 < |f1|/|f2| < 2.0$, and f1 is a focal length value of the first lens, f2 is a focal length value of the second lens.

3. The imaging lens module of claim 1, wherein $0.1 < |f2|/|f3| < 1.0$, and f2 is a focal length value of the second lens, f3 is a focal length value of the third lens.

4. The imaging lens module of claim 2, wherein $0.1 < |f2|/|f3| < 1.0$, and f2 is a focal length value of the second lens, f3 is a focal length value of the third lens.

5. The imaging lens module of claim 1, wherein $0 < |f3|/|f4| < 1.5$, and f3 is a focal length value of the third lens, f4 is a focal length value of the fourth lens.

6. The imaging lens module of claim 4, wherein $0 < |f3|/|f4| < 1.5$, and f3 is a focal length value of the third lens, f4 is a focal length value of the fourth lens.

7. The imaging lens module of claim 1, wherein $0.3 < |f34|/|f| < 1.5$, and f34 is an overall focal length value of the third lens and the fourth lens, f is a focal length value of the whole lens module.

8. The imaging lens module of claim 6, wherein $0.3 < |f34|/|f| < 1.5$, and f34 is an overall focal length value of the third lens and the fourth lens, f is a focal length value of the whole lens module.

9. The imaging lens module of claim 1, wherein $0.2 < |f/TL| < 0.8$, and f is a focal length value of the whole lens module, TL is the distance between a first surface of the first lens and an imaging surface.

10. The imaging lens module of claim 8, wherein the aspheric surface is in a shape satisfying a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

and z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

* * * * *